May 2, 1950 G. B. HAAS 2,505,893

SEALING STRIP FOR PANEL MEMBERS

Filed July 31, 1947

Inventor
Glenn B. Haas
By Barthel + Bugbee
Attorneys

Patented May 2, 1950

2,505,893

UNITED STATES PATENT OFFICE 2,505,893

SEALING STRIP FOR PANEL MEMBERS

Glenn B. Haas, Oak Harbor, Ohio, assignor to Window Products, Inc., Oak Harbor, Ohio, a corporation of Ohio Application July 31, 1947, Serial No. 765,041

10 Claims. (Cl. 20—56.4)

This invention relates to devices for sealing window panes into window frames or the like.

One object of this invention is to provide a sealing strip for sealing window panes into window frames or apertures either in stationary structures or in vehicles for land, water or air travel, wherein the window pane is quickly and easily inserted and sealed without the need for special tools or fixtures.

Another object is to provide a flexible sealing strip of resilient material for window panes which has a toggle action so that when the displaceable portion of the strip is pushed over a certain point, it snaps into place and is held firmly in position by the resilience of the strip material.

Another object is to provide a flexible sealing strip of resilient material, as set forth in the preceding objects, wherein the securing of the displaceable portion of the strip is assisted by the provision of mutually engageable serrations on the movable and fixed portions respectively of the strip.

Another object is to provide a flexible sealing strip of resilient material, as set forth in the preceding objects, wherein the strip also has provision for receiving the edge of an aperture in a structural member, such as a window opening in a sheetmetal plate.

Another object is to provide a flexible sealing strip of resilient material, as set forth in the preceding objects, wherein the movable and fixed portions of the strip may be easily separated to permit removal of the window pane or other panel which is held by the strip.

Another object is to provide a sealing strip for panels generally, in addition to window panes, wherein the panel is removably mounted between the fixed and separable portions of the strip, the device being adapted to hold opaque panels, as well as translucent or transparent ones, such opaque panels, for example, being employed to close access openings in various machines or structures.

Figure 1:
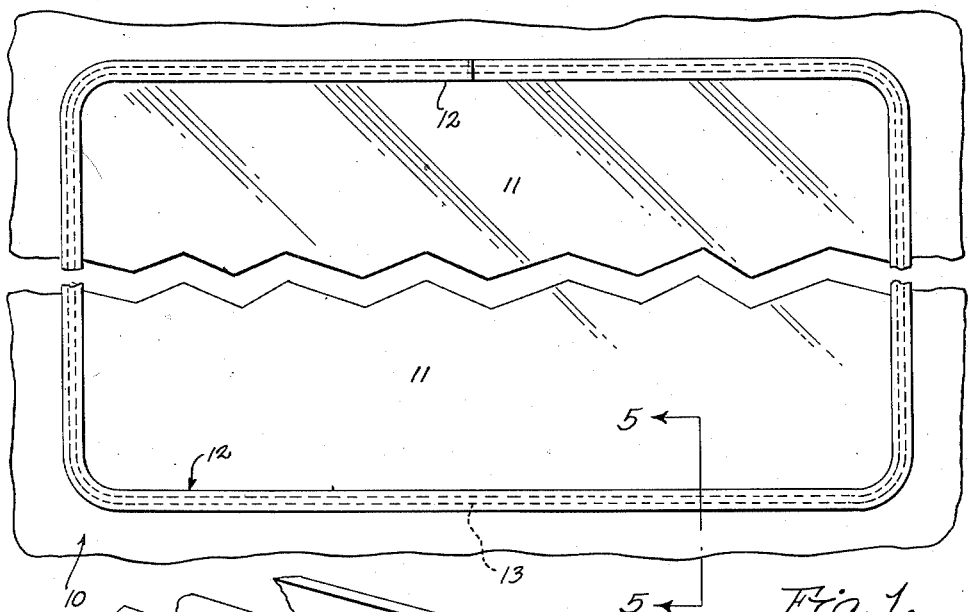
Figure 1 is a front elevation of a structure employing the sealing strip of the present invention for removably securing a panel in a structural opening.

Referring to the drawings in detail, Figure 1 shows a structure 10, such as the wall of a vehicle or building, or a bulkhead in a vessel, in which a panel 11, such as a window pane, is secured by means of a sealing strip 12, according to the present invention. The panel 11 may be opaque, such as would be used in removably closing and sealing an access opening, or it may be a transparent or translucent window. The structure 10 is shown as formed of sheet material, such as sheet metal, with an aperture 13 therein which is to be closed by the panel 11.

Figures 3, 4, 5:
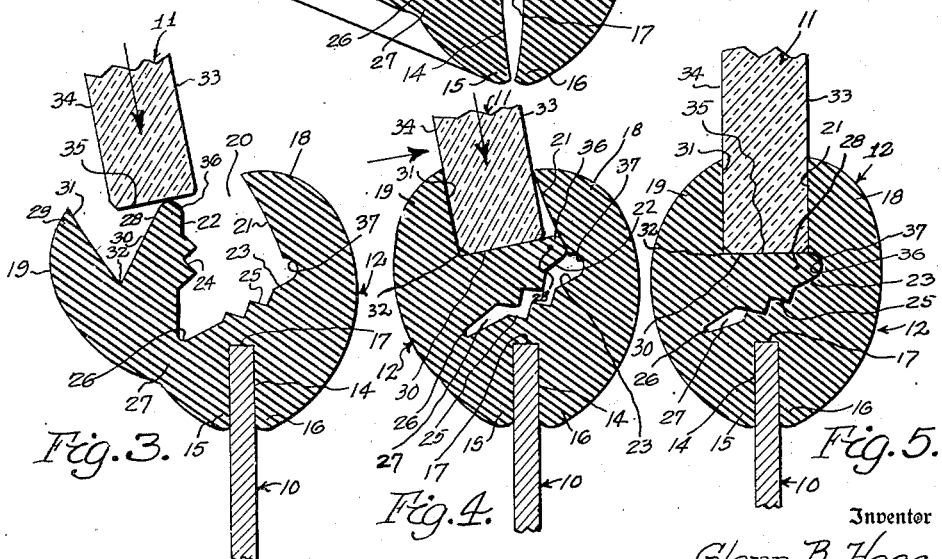
Figure 3 is an enlarged cross-section through the sealing strip shown in Figures 1 and 2, with the parts in the position of Figure 2, showing the first stage in the insertion of a panel.
Figure 4 is a view similar to Figure 3, but showing the parts in the second stage of securing a panel.
Figure 5 is a view taken along the line 5—5 in Figure 1 and similar to Figures 3 and 4, but showing the panel completely secured in position by the sealing strip.

The sealing strip 12 of the present invention is preferably made of rubber, synthetic rubber or other suitable elastic deformable material, and consists of an elongated member which is of approximately oval cross-section in its closed position (Figure 5). The sealing strip 12 may be endless if desired, or it may be cut to suitable lengths and squeezed into position. Where this is done, it is preferable to cut the strip slightly longer than the perimeter of the opening 13 into which it is to be fitted, so that the strip 12, when squeezed into position, will be slightly in a state of compression. This arrangement enhances the sealing qualities of the strip and insures the exertion of a firm grip on the panel 11 so that the latter is permanently held in a snug manner.

Figure 2:
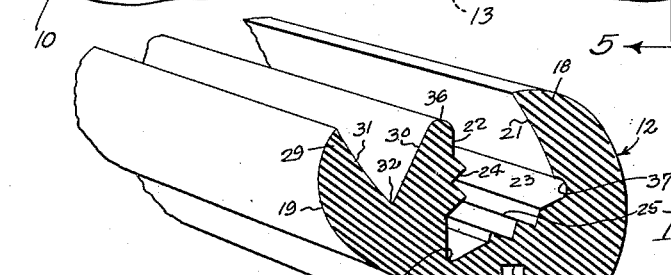
Figure 2 is an enlarged fragmentary perspective view of a portion of the sealing strip shown in Figure 1, with the movable portion thereof displaced into a position ready to receive a panel, such as a window pane.

The sealing strip 12 along its outer periphery is provided with a recess 14, such as a groove, for receiving the edge portion of the structure 10 adjacent the opening 13 (Figure 3). In the open position of the strip (Figure 2), the recess 14 is wider at the bottom than it is at the top or entrance, so that it possesses a roughly triangular cross-section, bounded by the outer lip portions 15 and 16 and the bottom wall 17 of the recess 14. Thus, the lip portions 15 and 16, when forced apart from the position of Figure 2 to that of Figure 3 to receive the structure 10, exert a resilient, yet firm, grip upon the structure 10.

Along its inner edge, the sealing strip 12 is provided with a fixed lip 18 and a movable lip 19. These are separated in their open positions (Figures 2 and 3) by a recess or channel 20 having side walls 21 and 22 and a bottom wall 23. The side wall 21 forms the inner wall of the lip 18 and directly engages the panel 11 in the closed position of the strip (Figure 5). The walls 22 and 23, however, are provided with interengaging serrations or ribs 24 and 25 respectively which interlock with one another in the closed position of the strip (Figure 5). The walls 22 and 23 meet at a line of junction 26, but remain slightly spaced apart from one another in the closed position of the strip, so as to provide an elongated chamber or passageway 27a extending around the sealing strip 12.

The movable lip 19 is joined to the remainder of the sealing strip 12, by a neck portion 27 lying adjacent the junction 26 and of narrower width than the adjacent portions of the strip. The movable lip 19 is provided with an inner portion 28 and an outer portion 29 having a longitudinal rabbet therein with side walls 30 and 31. The side walls 30 and 31 are preferably arranged at acute angles to one another in the open position so that they spring resiliently into a position at right angles to one another when the panel 11 is inserted, as shown in Figure 5. In this way a firm yet resilient grip is exerted upon the panel side and edge walls 33, 34 and 35 respectively. The outer edge of the inner lip 28 is rounded, as at 36, to enter a correspondingly rounded recess 37 forming the junction between the walls 21 and 23 of the sealing strip 12. This provides a further interlocking action between the movable and fixed lips 19 and 18 respectively (Figure 5).

In the operation of the invention, the sealing strip 12 is first inserted in the opening 13 by pushing it downward upon the edge of the structure 10 so that this edge enters the recess or groove 14 and comes to a halt against the bottom wall 17 thereof (Figure 3). If the sealing strip 13 is not endless, as is usually the case, the strip 12 is preferably cut to a slightly greater length than the perimeter of the opening 15, so that its opposite ends are squeezed into position against one another, placing the strip 12 in a condition of compression. The strip now occupies the position shown in Figure 3, ready for the insertion of the panel 11, such as a window pane, and the movable lip 19 is in its open position shown in Figures 2 and 3.

The edge 35 of the panel 11 is now pushed downward against the inner lip 28 (Figure 3), swinging both the inner and outer lips 28 and 29 of the movable lip 19 toward the fixed lip 18 around the neck portion 27 as a pivot (Figure 4). As this motion is continued, the upper edge of the panel 11 pushes in a similar manner laterally against the adjacent portion of the movable inner lip 28, swinging that portion likewise inward, and the same effect occurs on the vertical portions of the sealing strip 12 (Figure 1).

As the movable lip 19 swings past a position intermediate that shown in Figures 3 and 4, a toggle-like action occurs, as if the movable lip 19 were swinging over dead center. The result is that the movable lip 19, while at first resisting the inward swinging motion, subsequently snaps toward the fixed lip 18 when this dead center position is passed (Figure 4). As the panel 11 continues to be pushed into position, the rounded edge 36 snaps into the rounded groove 37 and, at the same time, the interengaging ridges 24 and 25 interlock (Figure 5), causing the fixed and movable portions 18 and 19 of the sealing strip 12 to be held firmly together. The wall 21 of the fixed lip 18 is urged into a position at right angles to the wall 35 and the latter is, in turn, urged into a position at right angles to the wall 31 during this sequence of operation. The resilience of the material in the neck portion 27 also assists in holding the movable and fixed lips 19 and 18 in engagement with one another.

To remove the panel 11 from the sealing strip 12, the reverse procedure is followed to that described above. A screw driver or other similar tool is inserted in the space between the wall 31 of the movable lip 19 and the side walls 34 of the panel 11 and pulled outward, causing the movable lip 19 to be swung outward from the position of Figure 5 through that of Figure 4 to that of Figure 3. At the same time, the rounded edge 36 snaps out of the rounded groove 37 (Figure 4) and the ribs or serrations 24 and 25 disengage. As the movable lip 19 moves outward away from the fixed lip 18, it passes over the dead center position previously mentioned, and moves into the open position shown in Figure 3. The panel 11 may then be completely removed and a new panel inserted.

What I claim is:

1. A mounting and sealing strip for securing panels in structure openings comprising an elongated strip of elastic, deformable material having along one edge a structure-edge-receiving recess and along another edge a pair of spaced, longitudinally-extending lips with a channel therebetween, one of said lips having a longitudinal rabbet therein with relatively angled walls, said rabbeted lip being swingable into said channel toward the other lip into a closed position against the bottom wall of said channel and leaving one wall of said channel exposed, said rabbet walls in the closed position of said lips cooperating with said exposed channel wall to define a longitudinal cavity configured to receive an edge portion of a panel.

2. A mounting and sealing strip for securing panels in structure openings comprising an elongated strip of elastic, deformable material having along one edge a structure-edge-receiving recess and along another edge a pair of spaced, longitudinally-extending lips with a channel therebetween, one of said lips having a longitudinal rabbet therein with relatively angled walls, said rabbeted lip being swingable into said channel toward the other lip into a closed position against the bottom wall of said channel and leaving one wall of said channel exposed, said rabbet walls in the closed position of said lips cooperating with said exposed channel wall to define a longitudinal cavity configured to receive an edge portion of a panel, one of said lips having a locking projection thereon within said channel and the other lip having a locking depression therein within said channel engageable with said projection.

3. A mounting and sealing strip for securing panels in structure openings comprising an elongated strip of elastic, deformable material having along one edge a structure-edge-receiving recess and along another edge a pair of spaced, longitudinally-extending lips with a channel therebetween, one of said lips having a longitudinal rabbet therein with relatively angled walls said rabbeted lip being swingable into said channel toward the other lip into a closed position against the bottom wall of said channel and leaving one wall of said channel exposed, said rabbet walls in the closed position of said lips cooperating with said exposed channel wall to define a longitudinal cavity configured to receive an edge portion of a panel, one of said lips having serrations thereon and one wall of said channel having serrations interengaging with said lip serrations.

4. A mounting and sealing strip for securing panels in structure openings comprising an elongated strip of elastic, deformable material having along one edge a structure-edge-receiving recess and along another edge a pair of spaced, longitudinally-extending lips with a channel therebetween, one of said lips having a longitudinal rabbet therein with relatively angled walls, said rabbeted lip being swingable into said channel toward the other lip into a closed position against the bottom wall of said channel and leaving one wall of said channel exposed, said rabbet walls in the closed position of said lips cooperating with said exposed channel wall to define a longitudinal cavity configured to receive an edge portion of a panel, one of said lips having a locking projection thereon within said channel and the other lip having a locking depression therein engageable with said projection, one of said lips having serrations thereon and one wall of said channel having serrations interengaging with said lip serrations.

5. A mounting and sealing strip for securing panels in structure openings comprising an elongated strip of elastic, deformable material having along one edge a structure-edge-receiving recess and along another edge a pair of spaced, longitudinally-extending lips with a channel therebetween, one of said lips having thereon a pair of ridges with a rabbet therebetween having relatively-angled walls, said rabbeted lip being swingable into said channel toward the other lip with one of said ridges engageable with the bottom wall of said channel and leaving one wall of said channel exposed, the walls of said lip rabbet cooperating with said exposed wall of said channel in the swung position of said lips to define a longitudinal cavity configured to receive an edge portion of a panel.

6. A mounting and sealing strip for securing panels in structure openings comprising an elongated strip of elastic, deformable material having along one edge a structure-edge-receiving recess and along another edge a pair of spaced, longitudinally-extending lips with a channel therebetween, one of said lips having thereon a pair of ridges with a rabbet therebetween having relatively angled walls, said rabbeted lip being swingable into said channel toward the other lip with one of said ridges engageable with the bottom wall of said channel and leaving one wall of said channel exposed, the walls of said lip rabbet being cooperable with said exposed wall of said channel in the swung position of said lips to provide a panel-edge-receiving recess.

7. A mounting and sealing strip for securing panels in structure openings comprising an elongated strip of elastic, deformable material having along one edge a structure-edge-receiving recess and along another edge a pair of spaced, longitudinally-extending lips with a channel therebetween, one of said lips having thereon a pair of ridges with a rabbet therebetween having relatively angled walls, said rabbeted lip being swingable into said channel toward the other lip with one of said ridges engageable with the bottom wall of said channel and leaving one wall of said channel exposed, the walls of said lip rabbet cooperating with said exposed wall of said channel in the swung position of said lips to define a longitudinal cavity configured to receive an edge portion of a panel, one of said lips having a locking projection thereon within said channel and the other lip having a locking depression therein within said channel engageable with said projection.

8. A mounting and sealing strip for securing panels in structure openings comprising an elongated strip of elastic, deformable material having along one edge a structure-edge-receiving recess and along another edge a pair of spaced, longitudinally-extending lips with a channel therebetween, one of said lips having thereon a pair of ridges with a rabbet therebetween having relatively angled walls, said rabbeted lip being swingable into said channel toward the other lip with one of said ridges engageable with the bottom wall of said channel and leaving one wall of said channel exposed, the walls of said lip rabbet cooperating with said exposed wall of said channel in the swung position of said lips to define a longitudinal cavity configured to receive an edge portion of a panel, one of said lips having serrations thereon and one wall of said channel having serrations interengaging with said lip serrations.

9. A mounting and sealing strip for securing panels in structure openings comprising an elongated strip of elastic, deformable material having along one edge a structure-edge-receiving recess and along another edge a pair of spaced, longitudinally-extending lips with a channel therebetween, one of said lips having thereon a pair of ridges with a rabbet therebetween having relatively angled walls, said rabbeted lip being swingable into said channel toward the other lip with one of said ridges engageable with the bottom wall of said channel and leaving one wall of said channel exposed, the walls of said lip rabbet cooperating with said exposed wall of said channel in the swung position of said lips to define a longitudinal cavity configured to receive an edge portion of a panel, one of said lips having a locking projection thereon within said channel and the other lip having a locking depression therein within said channel engageable with said projection, one of said lips having serrations thereon and one wall of said channel having serrations interengaging with said lip serrations.

10. A mounting and sealing strip for securing panels in structure openings comprising an elongated strip of elastic, deformable material having along one edge a structure-edge-receiving recess and along another edge a pair of spaced, longitudinally-extending lips with a channel therebetween, one of said lips having thereon a pair of ridges with a rabbet therebetween having relatively angled walls, said rabbeted lip being swingable into said channel toward the other lip with one of said ridges engageable with the bottom wall of said channel and leaving one wall of said channel exposed, the walls of said lip rabbet cooperating with said exposed wall of said channel in the swung position of said lips to define a longitudinal cavity configured to receive an edge portion of a panel, the walls of said lip rabbet being arranged at an acute angle to one another.

GLENN B. HAAS.

REFERENCES CITED

The following references are of record in the file of this patent:

UNITED STATES PATENTS

| Number | Name | Date |
| --- | --- | --- |
| 2,288,329 | Smith | June 30, 1942 |